United States Patent
Agarwal et al.

(10) Patent No.: US 9,256,004 B2
(45) Date of Patent: Feb. 9, 2016

(54) SYSTEM AND METHOD FOR TRANSMITTING DIFFERENTIAL WEATHER INFORMATION TO AN IN-FLIGHT AIRCRAFT

(75) Inventors: Anand Agarwal, Karnataka (IN); SatyaBhaskar Payasam, Andhra Pradesh (IN); David Allen Brabham, Maple Valley, WA (US); Trip Redner, Kirkland, WA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 361 days.

(21) Appl. No.: 13/443,676

(22) Filed: Apr. 10, 2012

(65) Prior Publication Data
US 2013/0267186 A1 Oct. 10, 2013

(51) Int. Cl.
*H04W 4/00* (2009.01)
*G01W 1/10* (2006.01)

(52) U.S. Cl.
CPC ...................................... *G01W 1/10* (2013.01)

(58) Field of Classification Search
CPC ........... G01W 1/10; G01W 1/08; G01W 1/04; G01W 1/16; G01S 7/003; H04B 7/18506
USPC ................ 455/41.2, 41.3, 430, 431
See application file for complete search history.

(56) References Cited

U.S. PATENT DOCUMENTS

| | | | |
|---|---|---|---|
| 5,265,024 A * | 11/1993 | Crabill et al. | 701/538 |
| 6,604,236 B1 | 8/2003 | Draper et al. | |
| 7,027,898 B1 * | 4/2006 | Leger et al. | 701/14 |
| 7,129,857 B1 * | 10/2006 | Spirkovska | 340/971 |
| 2008/0243319 A1 | 10/2008 | Coulmeau et al. | |
| 2009/0012663 A1 | 1/2009 | Mead et al. | |
| 2010/0115137 A1 * | 5/2010 | Kim et al. | 709/247 |

FOREIGN PATENT DOCUMENTS

| | | |
|---|---|---|
| EP | 2320406 A1 | 5/2011 |
| WO | 2011128832 A2 | 10/2011 |

OTHER PUBLICATIONS

EP Examination Report for application No. EP 13 160 652.7 dated Dec. 16, 2013.
EP Search Report for application No. EP 13 160 652.7 dated Jul. 26, 2013.

\* cited by examiner

*Primary Examiner* — Yuwen Pan
*Assistant Examiner* — Fatuma Sherif
(74) *Attorney, Agent, or Firm* — Ingrassia Fisher & Lorenz, P.C.

(57) ABSTRACT

Systems and methods are provided for transmitting updated weather data to an in-flight aircraft. The aircraft transmits a request for updates to a ground system that determines if the data has changed since the last transmission and transmits only the changed data. Data may be tailored to pilot preferences or to pilot requests for data representing a predetermined history.

14 Claims, 6 Drawing Sheets

SYSTEM AND METHOD FOR TRANSMITTING DIFFERENTIAL WEATHER INFORMATION TO AN IN-FLIGHT AIRCRAFT

TECHNICAL FIELD

Embodiments of the subject matter described herein relate generally to data transmission and, more particularly, to systems and methods for detecting and transmitting differential weather data to an in-flight aircraft.

BACKGROUND

Prior to a flight, a pilot may obtain, as part of a pre-flight briefing for example, current weather information relating to a proposed route and/or a possible alternative route. On longer flights, it is not uncommon for a pilot to request weather updates.

Currently, when a pilot requests updated weather information, the system transmits all active weather data including data that the pilot has already seen. Thus, there results an uplinking of a great deal of redundant data that has already been read and acknowledged. When this data is received at the onboard Flight Management System (FMS), the pilot must scroll through each message since both old and new information has been received.

In addition to the inconvenience created for the pilot, the increased size of the data packet(s) causes transmission time, and the costs associated therewith, to increase significantly. This problem is exacerbated for customers using satellite communication and incurring costs on a per-character basis.

Considering the foregoing, it would be desirable to provide systems and methods for transmitting non-redundant, updated (delta) weather data to an in-flight aircraft.

It would also be desirable to provide systems and methods for transmitting delta weather data to an in-flight aircraft in accordance with pilot preferences.

Furthermore, other desirable features and characteristics will become apparent form the subsequent detailed description and the appended claims, taken in conjunction with the accompanying drawings and the foregoing technical field and background.

BRIEF SUMMARY

A method is provided suitable for transmitting updated data to an in-flight aircraft. A ground system receives a request for delta data, and transmits delta data to the aircraft.

A method is also provided for recovering updated weather information onboard an in-flight aircraft. The aircraft requests and receives only weather information that has changed since the last transmission of weather information to the aircraft.

A system for transmitting updated weather data to an in-flight aircraft is also provided. A request for updated weather data is received as a receiver that is coupled to a processor. The processor is responsive to the request and is configured to determine if weather data has changed since a last transmission of weather data to the aircraft. A transmitter then transmits updated weather data to the aircraft.

This summary is provided to introduce a selection of concepts in a simplified form that are further described below in the detailed description. This summary is not intended to identify key features or essential features of the claimed subject matter, nor is it intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figure, wherein like referenced numbers refer to similar elements throughout the figures.

DETAILED DESCRIPTION

Figure 1:
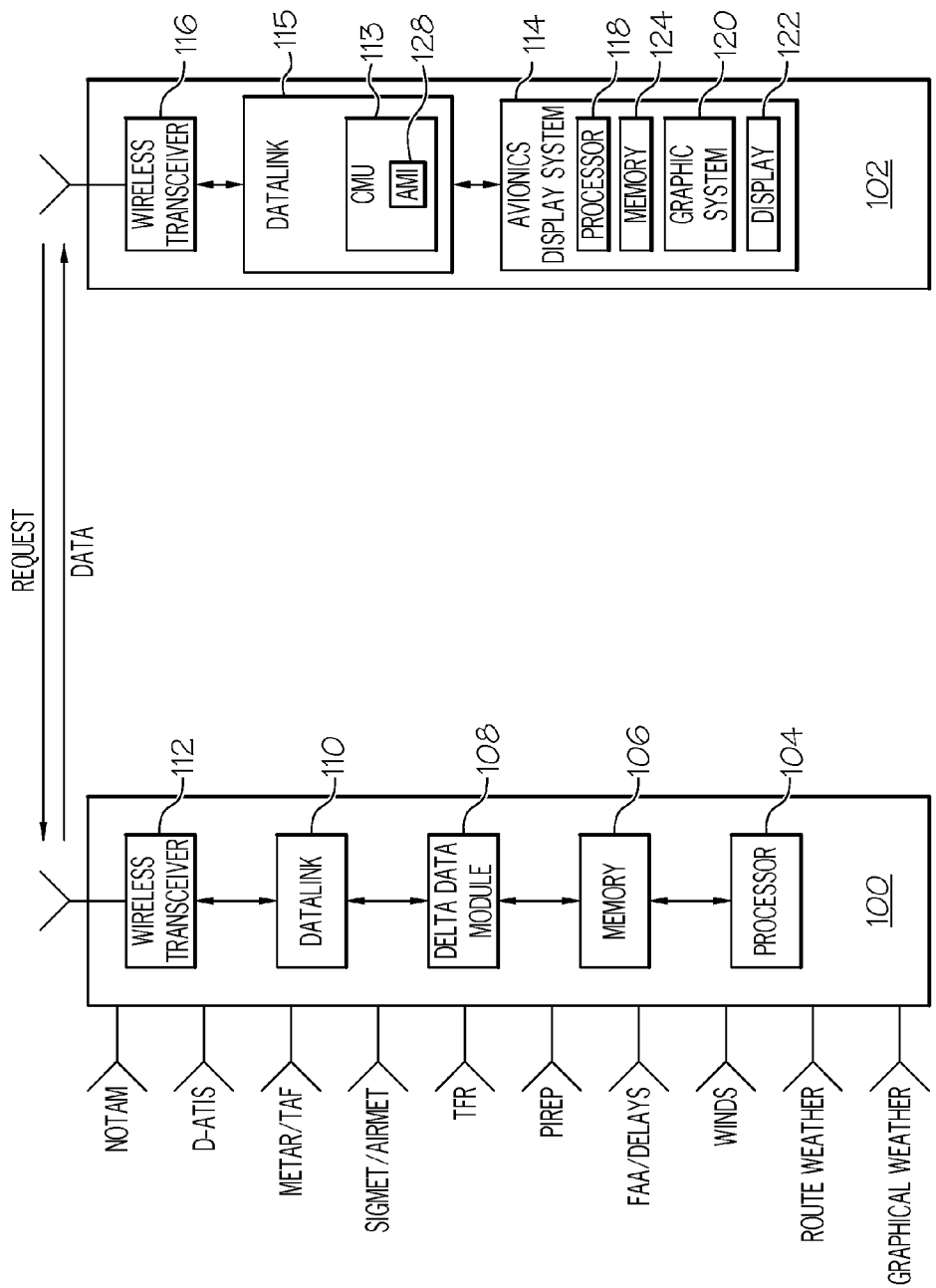
FIG. 1 is a block diagram of a system for providing an aircraft with updated weather reports (delta weather data), that may include graphical weather data, from a ground station.

The following detailed description is merely exemplary in nature and is not intended to limit the information or the application and uses of the invention. Furthermore, there is no intention to be bound by any theory presented in the proceeding background or the following detailed description.

The embodiments described hereinafter contemplated a system comprising ground-based modules that operate in a synchronous manner to automatically detect and uplink only the latest weather to a pilot.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

A pilot creates preferences in the ground based system based on airline or personal profiles and/or selects the weather instruments for which the pilot wants to receive delta weather information. A pilot may select a pre-configured option to select a delta weather request. This pre-configured option is made available through the AMI (Airline Modifiable Interface). In this manner, the pilot may selectively request a full weather response (delta character OFF) or a delta weather response (delta character ON). Alternatively it is contemplated that a pilot may request a weather update for a last predetermined period of time. For example, the pilot may request any update in NOTAM (Notice to Airmen) in the last two hours.

It is contemplated that the system will store all requests for data and keep track of the last data update. Thus, the system will receive weather requests, prepare a delta weather report, and uplink the relevant data; all without manual intervention. If no changes in weather are detected since the last transmission, a message such as "Aircraft Has Current Data" may be uplinked. It is also contemplated that the system will handle graphical weather requests. If there is no change between the current weather image and the last uplinked image, the latest image may not be uplinked.

Thus, by tracking the last weather report and transmitting only delta weather reports in accordance with, for example, pilot preferences, transmission speeds of the uplinked data are increased, costs are reduced, and the pilot experiences a more efficient process.

FIG. 1 is a block diagram of one exemplary embodiment of a system for carrying out the above described data transfers. The system comprises a ground-based sub-system 100 and an airborne sub-system 102. Ground-based system 100 without limitation, includes, a processor 104, a memory 106, a delta data module 108, a datalink 110, and a wireless transmission 112. The ground system is in wireless communication with on-board system 102, which includes without limitation, an avionics display system 114 coupled to wireless transceiver via datalink 115. Avionics display system 114 includes, without limitation, processor 118, graphics system 120, display 122, and memory 124. The datalink 115 includes communication management unit (CMU) 113 including AMI interface 128. It should be noted that for the sale of clarity and believing, FIG. 1 does not depict the vast number of ground-based and on-board systems and subsystems that would be utilized on the ground and onboard a practical implementation of an aircraft. Instead, FIG. 1 merely depicts some of the notable functional elements and components that support the various features, functions, and operations described in more detail below. In practice, ground-based system 100 and airborne system 102 includes other devices and components for providing additional functions and features. Furthermore, the elements of ground-based system 100 and airborne system 102 may each have implemented in a distributed manner using any number of distinct elements of hardware and/or software.

The processor 104 and 118 may each be implemented or realized with at least one general purpose processor, a content addressable memory, a digital signal processor, an application specific integrated circuit, a field programmable gate array, any suitable programmable logic device, discrete gate or transistor logic, discrete hardware components, or any combination designed to perform the functions described here. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration.

The processors 104 and 118 may each be implemented or realized with at least one general purpose processor, a content addressable memory, a digital signal processor, an application specific integrated circuit, a field programmable gate array, any suitable programmable logic device, discrete gate or transistor logic, discrete hardware components, or any combination designed to perform the functions described here. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration. As described in more detail below, processors 104 and 118 are configured to support various electric taxi guidance processes, operations, and display functions.

In practice, the processor architecture 118 may be realized as an onboard component of the aircraft 100 (e.g., a flight deck control system, a flight management system, or the like), or it may be realized in a portable computing device that is carried onboard an aircraft. For example, processor 118 could be realized as the central processing unit (CPU) of a laptop computer, a tablet computer, or a handheld device. As another example, the processor architecture 118 could be implemented as the CPU of an electronic flight bag carried by a member of the flight crew or mounted permanently in the aircraft. Electronic flight bags and their operation are explained in documentation available from the United States Federal Aviation Administration (FAA), such as FAA document AC 120-76A.

Processors 104 and 118 may include or cooperate with an appropriate amount of memory, which can be realized as RAM memory, flash memory, EPROM memory, EEPROM memory, registers, a hard disk, a removable disk, a CD-ROM, or any other form of storage medium known in the art. In this regard, the memories can be coupled to processors 104 and 118 such that the processors can read information from, and write information to, the memory. In the alternative, the memory may be integral to the processors. In practice, a functional or logical module/component of the system described here might be realized using program code that is maintained in the memory. Moreover, the memory can be used to store data utilized to support the operation of the system, as will become apparent from the following description.

Memories 106 and 124 may be realized as RAM memory, flash memory, EPROM memory, EEPROM memory, registers, a hard disk, a removable disk, a CD-ROM, or any other form of storage medium known in the art. In this regard, memories 106 and 124 can be coupled to the processors 104 and 118 respectively, such that the processors can read information from, and write information to, the memories. In the alternative, the memories may be integral to the processors. As an example, the processor 104 and the memory 106 may reside in an ASIC. In practice, a functional or logical module/component of the display system might be realized using program code that is maintained in the memory. For example, other components shown in FIG. 1 have associated software program components that are stored in the memories 106 and 124.

In an exemplary embodiment, the display 122 is coupled to the graphics system 120. The graphics system 120 is coupled to the processor 118 via memory 124 such that the processor 118, memory 124, and the graphics system 120 cooperate to display, render, or otherwise convey one or more graphical representations, synthetic displays, graphical icons, visual symbology, or images associated with operation of the host aircraft on the display element 122. An embodiment of display 122 may utilize existing graphics processing techniques and technologies in conjunction with the graphics system 120. For example, the graphics system 120 may be suitably configured to support well known graphics technologies such as, without limitation, VGA, SVGA, UVGA, or the like.

In an exemplary embodiment, the display 122 is realized as an electronic display configured to graphically display flight information or other data associated with operation of the host aircraft under control of the graphics system 120. In practice, the processor 118 and/or the graphics system 120 produces image rendering display commands that are received by the display 122 for purposes of rendering the display. The display 122 is usually located within a cockpit of the host aircraft. It will be appreciated that although FIG. 1 shows a single display element 122, in practice, additional display devices may be present onboard the host aircraft.

The data links 110 and 115 enable the host aircraft to communicate with ground system 100. In this regard, the data link subsystems 110 and 115 may be used to exchange data between the host aircraft and ground system 100 in compliance with known standards and specifications. Using the data link 115, the aircraft 102 can send delta weather requests to ground system 100 and in turn, ground system 100 can provide weather data to the requesting aircraft.

Referring still to FIG. 1, new data is received by delta data module 108. This may include NOTAM (Notices to Airmen), e.g. hazards such as air-shows, closed runways, military exercises; D-ATIS (Digital Automatic Terminal Information Service), e.g. weather, runway, approach information; METAR, e.g. weather report used by pilots as part of a pre-flight weather briefing; TAF (Terminal Aerodrome Forecast), e.g. weather forecast applicable to a five mile radius from the center of an airport runway; SIGMET (Significant Meteorological Information), e.g. meteorological information concerning safety of all aircraft; AIRMET (Airmen's Meteorological Information), e.g. weather along an air route that may affect aircraft safety; TFR (Temporary Flight Restrictions), e.g. sporting events, national disaster areas, space launches, etc.; PIREP (Pilot Report), an actual weather condition encountered by an aircraft in flight; FAA delays; winds; route weather; graphical weather data; etc. Such data in textual or graphical form is provided, in part, by vendors. The data may then be compared in delta data module 108 with historical weather data stored in memory 106 to determine any changes; i.e. the delta data. The delta data is then supplied to data link 110. After filtering in accordance with pilot preferences, if any, or in accordance with a delta character in the request for data, if any, the filtered delta data is transmitted via transceiver 112.

FIG. 2-6 are flow charts that illustrates an exemplary embodiments of methods for transmitting differential (delta) weather information to an in-flight aircraft suitable for use in conjunction with the system shown in FIG. 1. The various tasks performed in connection with these processes may be performed by software, hardware, firmware, or any combination thereof. For illustrative purposes, the following description may refer to elements mentioned above in connection with FIG. 1. In practice, portions of these processes may be performed by different elements of the described system, e.g., a processor, a display element, or a data communication component. It should be appreciated that these processes need not be performed in the illustrated order, and the processes may be incorporated into a more comprehensive procedure or process having as additional functionality not described in detail herein. Moreover, one or more of the tasks shown may be omitted as long as the intended overall functionality remains intact.

Figure 2:
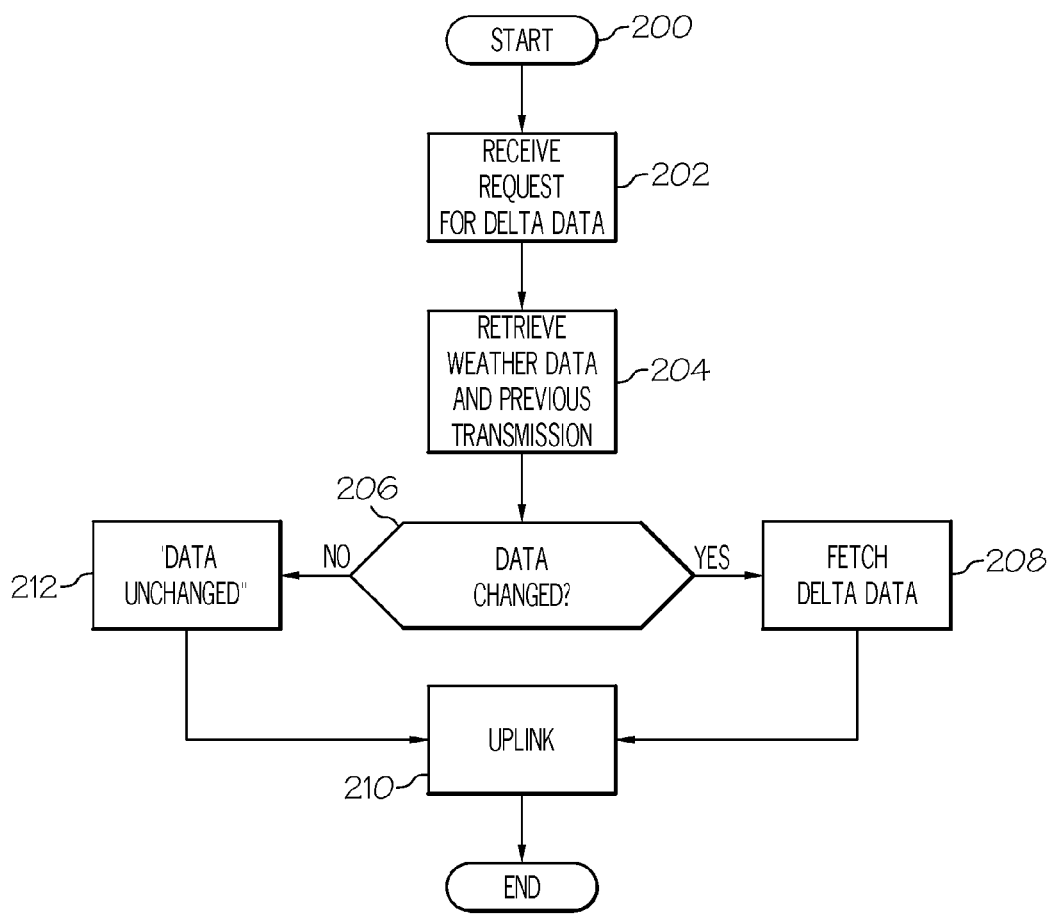
FIG. 2 is a flow chart illustrating a method for providing an aircraft with delta data in accordance with a first exemplary embodiment.

FIG. 2 is a flow chart illustrating a first exemplary embodiment of a method 200 for transmitting delta weather information to an in-flight aircraft requesting only delta data. The process begins when ground based equipment 100 receives a request for delta data (STEP 202) from and in-flight aircraft via transceivers 116 and 112 (FIG. 1). Recently received weather data is retrieved and is compared with the data previously transmitted (STEP 204). The recently received data is compared with the previously transmitted data to determine in the data has changed (STEP 206). If so, the changed data (delta data) is fetched (STEP 208) and transmitted to the aircraft (STEP 210). If the data is unchanged, a message to that effect is generated (STEP 212) and uplinked to the aircraft (STEP 210).

Figure 3:
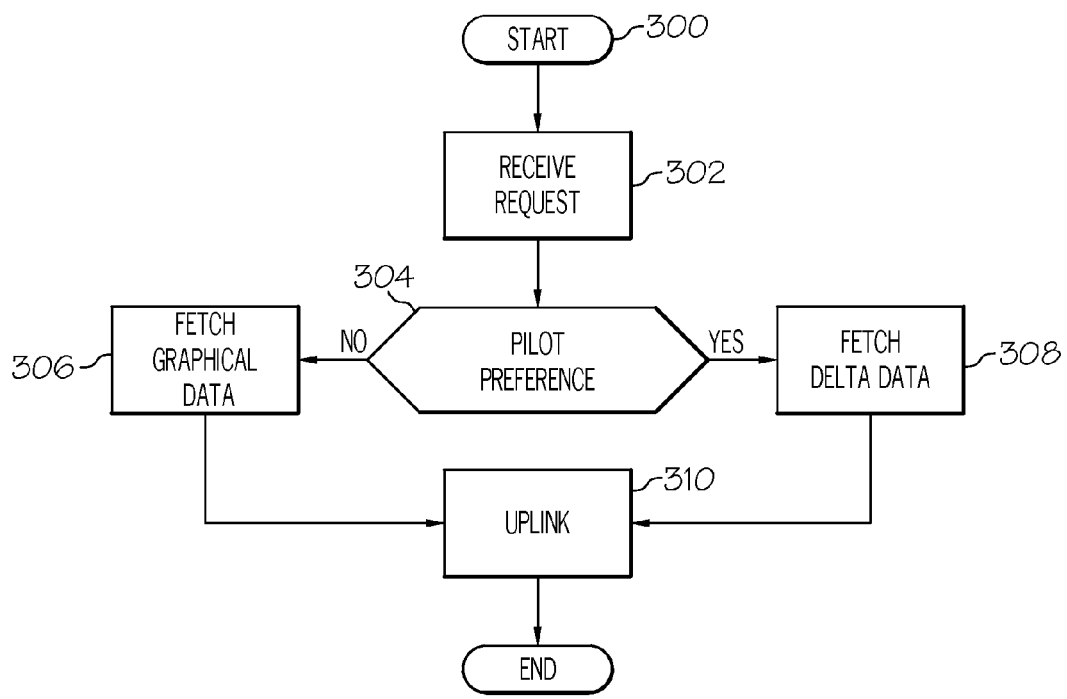
FIG. 3 is a flow chart illustrating a method for providing an aircraft with delta data in accordance with a further exemplary embodiment.

FIG. 3 is a flow chart illustrating a further exemplary embodiment of a method 300 for transmitting delta weather information to an in-flight aircraft. As suggested previously, delta weather may be the result of tailoring the data to one or more stored pilot preferences. After receiving a data request (STEP 302), memory 106 (FIG. 1) is accessed to determine if the pilot has requested that data be supplied in accordance with pilot preferences (STEP 304). If no preference is found, the complete data set is fetched (STEP 306) and transmitted to the inflight aircraft (STEP 310). If a preference does exist (STEP 304), the data is tailored to that preference and the delta data is fetched (STEP 308). The result is transmitted to the in-flight aircraft (STEP 310). It is also contemplated that the pilot preferences may be overridden to receive complete weather data.

Figure 4:
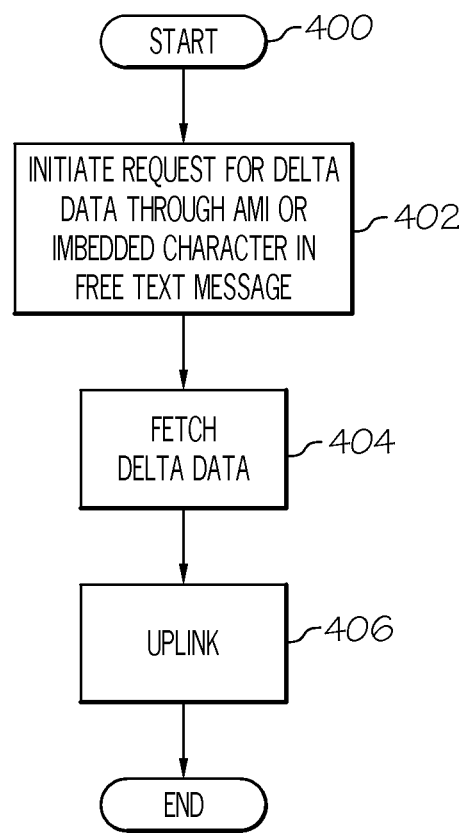
FIG. 4 is a flow chart illustrating a method for providing an aircraft with delta data in accordance with a still further exemplary embodiment.

FIG. 4 illustrates a still further exemplary embodiment of a method 400 for transmitting delta weather information to an in-flight aircraft. In this case, the delta request is through a pre-configured option made available through the AMI. Additionally delta weather request can also be requested by imbedding a delta character in a free text message (STEP 402). After the request is received, the delta data is fetched (STEP 404) and uplinked (STEP 406) as was the case in FIG. 2.

Figure 5:
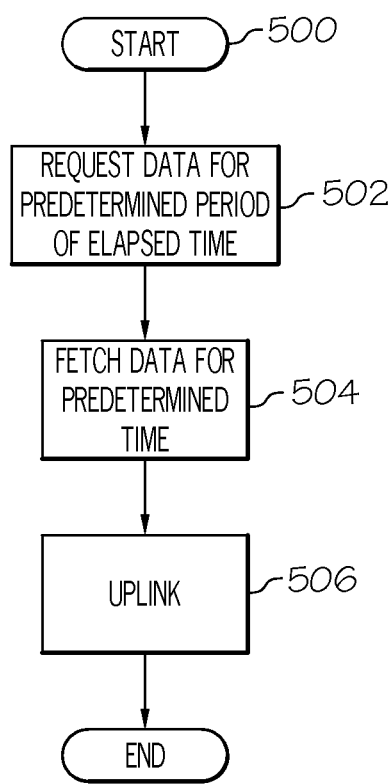
FIG. 5 is a flow chart illustrating a method for providing an aircraft with delta data in accordance with yet another exemplary embodiment.

FIG. 5 is a flow chart of yet another exemplary embodiment of a method 500 for transmitting delta data to an in-flight aircraft. The request, in this case, is for a data update that includes a predetermined amount of time that has elapsed; e.g. the past four fours (STEP 502). The update is fetched (STEP 504) and the delta data is transmitted to the aircraft (STEP 506).

Figure 6:
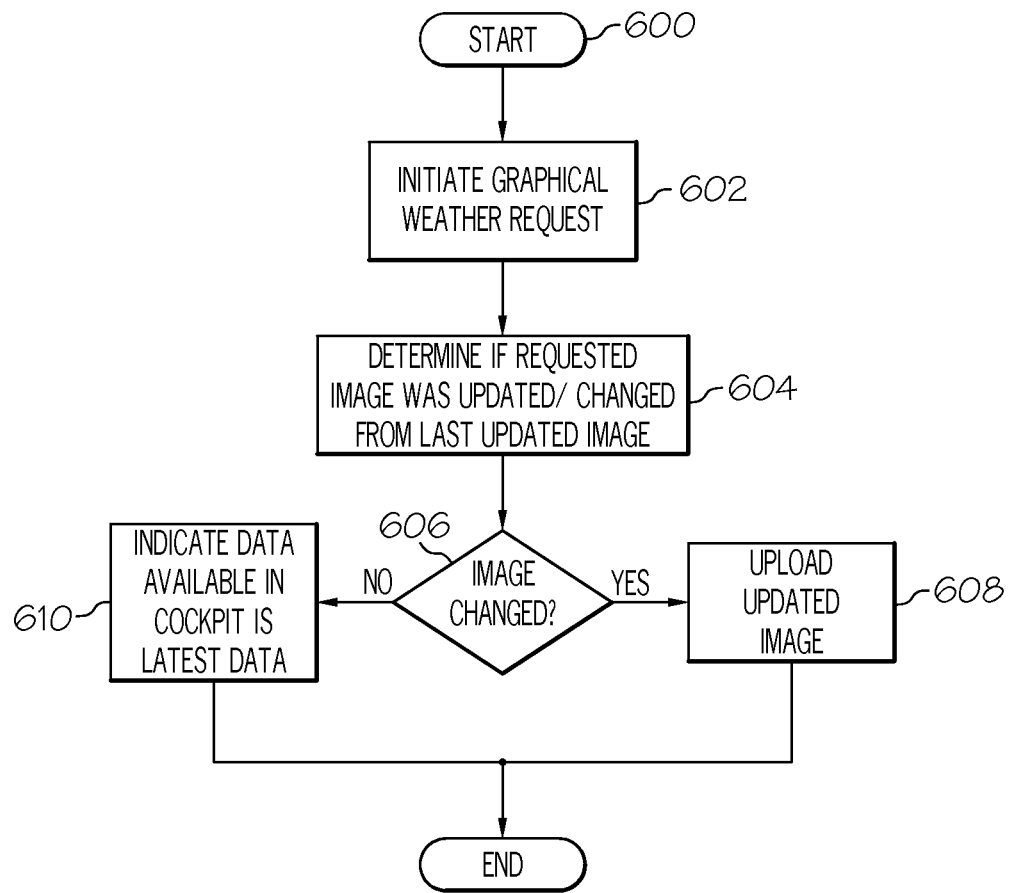
FIG. 6 is a flow chart illustrating a method for providing an aircraft with delta graphical in accordance with yet another embodiment.

FIG. 6 is a flow chart illustrating a method 600 for providing an aircraft with delta graphical data in accordance with yet another embodiment. After a graphical weather request is initiated (STEP 602), a determination is made as to whether the requested image or images have been changed or updated since the last uplinked image (STEP 604). If changed, the new graphical data is uplinked (STEP 608). If unchanged, an indication that the data available in the cockpit is the latest data (STEP 610) is provided.

Thus, there has been provided systems and methods for transmitting non-redundant, updated (delta) weather to an in-flight aircraft. Since different pilots can fly the same tail but have different preferences, a ground based system monitors and tracks the last weather information requested per pilot per tail. Upon receiving a new weather request, only delta weather information is transmitted if the weather has changed. Thus, pilots view only the latest information and therefore scroll through fewer messages. This makes it feasible to receive even international weather that is seldom requested because of size. Since fewer characters are uplinked, cost is reduced. For example, the average NOTAM message size is approximately 12 KB, while a differential message will require only about 1-2 KB. Because of the reduced size, the time needed to uplink to the FMS is significantly reduced.

While at least one exemplary embodiment has been presented in the foregoing detailed description, it should be appreciated that a vast number of variations exist. For example, the techniques and methodologies presented here could also be deployed as part of a fully automated guidance system to allow the flight crew to monitor and visualize the execution of automated maneuvers. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application

What is claimed is:

1. A method for transmitting data to an in-flight aircraft, the method comprising:
    receiving, at a ground-based system, pilot preferences created based on airline or personal profiles;
    storing, at the ground based system, the pilot preferences;
    receiving a first transmission of weather data;
    receiving a second transmission of weather data, wherein the first transmission of weather data and the second transmission of weather data define a complete data set;
    comparing the second transmission of weather data to the first transmission of weather data to identify delta data representing only changes between the second transmission of weather data and the first transmission of weather data;
    receiving, by the ground-based system, a data request from the in-flight aircraft;
    in response to the data request, determining, by the ground-based system, whether the pilot has requested that data be supplied in accordance with the stored pilot preferences;
        when the pilot has requested that the data be supplied in accordance with the stored pilot preferences (i) creating modified delta data in accordance with the pilot preferences; and (ii) transmitting the modified delta data to the in-flight aircraft; and
        when the pilot has not requested that data be supplied in accordance with stored pilot preferences, transmitting the complete data set.

2. A method according to claim 1 further comprising transmitting an indicator that the data has not changed since the last transmission when changes are not identified.

3. A method according to claim 1 further comprising:
    receiving a request that weather data for a predetermined period of past time be transmitted; and
    transmitting the requested weather data.

4. A method according to claim 1 wherein the first transmission and second transmission of weather data comprise graphical weather data.

5. A method according to claim 1 further comprising requesting only weather information updates for a predetermined period of elapsed time.

6. A method according to claim 1 further comprising setting a delta character in a request for weather data indicating that only delta weather data is to be transmitted.

7. A method according to claim 1 further comprising optionally overriding stored pilot preferences and transmitting the first and the second transmission of weather data to the in-flight aircraft.

8. A method according to claim 2 further comprising storing past weather transmissions.

9. A method according to claim 4 further comprising transmitting an indicator that the graphical weather data has not changed since the last transmission when changes are not identified.

10. A ground-based system for transmitting data to an in-flight aircraft, the system comprising:
    a source of weather data, wherein the weather data comprises a first transmission of weather data and a second transmission of weather data, and wherein a complete set of data comprises the first transmission of weather data and the second transmission of weather data;
    a first receiver for receiving pilot preferences created based on airline or a personal profiles;
    a second receiver for receiving a request for data from the in-flight aircraft;
    a transmitter configured to transmit data to the in-flight aircraft; and
    a processor coupled to the source of weather data, the first receiver, the second receiver, and the transmitter and configured to
    (i) store the pilot preferences,
    (ii) in response to a data request, determine whether the pilot has requested that data be supplied in accordance with stored pilot preferences,
        when the pilot has requested that data be supplied in accordance with stored pilot preferences:
            (A) compare the second transmission of weather data to the first transmission of weather data to identify delta data representing only changes between the second transmission of weather data and the first transmission of weather data, and
            (B) (B) modify the delta data in accordance with the pilot preferences, and
            (C) command the transmitter to transmit the modified delta data; and
        when the pilot has not requested that data be supplied in accordance with stored pilot preferences, command the transmitter to transmit the complete set of data.

11. A system according to claim 10 wherein the processor is further configured to transmit delta data for a requested period of elapsed time.

12. A system according to claim 10 wherein the processor is further configured to transmit an indication that the data has not changed since the last transmission of data when changes are not identified.

13. A system according to claim 10 further comprising a memory for storing past weather transmissions from pilot per aircraft.

14. A system according to claim 13 further comprising a module for comparing current weather data with the most recently transmitted weather data.

* * * * *